United States Patent Office 3,173,856
Patented Mar. 16, 1965

3,173,856
REFORMING REACTIONS CATALYZED BY PLATINUM AND PALLADIUM CATALYSTS
William P. Burton, Little Silver, Herman S. Kaufman, Teaneck, and Philip A. Lefrancois, Cranford, N.J., and Earl W. Riblett, New York, N.Y., assignors to Pullman Incorporated, a corporation of Delaware
No Drawing. Filed Apr. 23, 1952, Ser. No. 283,997
5 Claims. (Cl. 208—138)

This invention relates to improved catalytic reactions, and more particularly pertains to improved processes wherein a platinum and/or palladium containing catalyst is employed. This application is related to application Serial No. 283,996, filed concurrently herewith.

An object of this invention is to provide improved catalytic reactions utilizing a platinum and/or palladium catalyst.

Another object of this present invention is to provide an improved method for catalyzing hydrocarbon conversion with a platinum and/or palladium containing catalyst.

Still another object of this invention is to provide an improved catalytic process for altering the carbon-hydrogen ratio of a hydrocarbon.

A further object of this invention is to provide an improved process for reforming naphthas.

A still further object of the present invention is to provide an improved method for hydroforming petroleum naphthas.

Other objects and advantages of the present invention will become apparent from the following description and explanation thereof.

The present invention comprises a novel catalytic process in which is utilized a catalyst comprising platinum and/or palladium on eta-alumina.

The process of the present invention possesses numerous outstanding advantages and has a wide field of utility. In general, the process is suitable for any reactions which are susceptible to catalysis with platinum and/or palladium, in combination with eta-alumina, with or without silica being present. Our invention is applicable to a variety of hydrocarbon conversion reactions, particularly those in which the hydrogen-carbon ratio is altered. Among the numerous reactions for which our process is applicable are dehydrogenation, hydrogenation, hydrogenolysis, cracking, hydrocracking (cracking under hydrogen pressure), isomerization, oxidation, aromatization, polymerization, cyclization, hydrodesulfurization, alkylation, dealkylation, and hydrogen exchange systems.

The process of the present invention is particularly adapted for reforming naphtha stocks. In reforming naphtha or gasoline stocks with the catalyst disclosed herein, the conditions may be varied rather widely; thus temperatures of about 600° to about 1050° F. are suitable and the preferred range is from about 900° to about 950° F. Within these temperature limits, weight space velocities of about 0.05 to about 10.0 pounds of naphtha per hour per pound of catalyst in the reaction zone may be employed advantageously; however, space velocities of about 0.25 to about 5.0 provide the best results. Hydrogen should be introduced into the reforming reactor at rates running from about 0.5 to about 20.0 mols of hydrogen per mol of hydrocarbon reactants. This hydrogen may be in admixture with light gaseous hydrocarbons. In fact, it is usually introduced by recycling the normally gaseous products, chiefly hydrogen along with about 10–50% by volume more or less of hydrocarbons containing 1–3 carbon atoms from the reforming reaction. One important function of hydrogen is to maintain the activity of the contact material by minimizing coke deposition thereon. While the total reaction pressure may be maintained at any value between about 50 and about 1000 pounds per square inch gauge (p.s.i.g.), the best results are obtained by holding the reaction pressure within the range between about 100 and about 750 p.s.i.g. The conditions can be varied to include operations wherein there is a net consumption of hydrogen as well as a net production of hydrogen as in "hydroforming."

The process of this invention can involve a static or fluid bed of catalyst, and can also involve a fixed bed or a circulating bed. In any case, the catalyst can be in lump, granular or finely divided form. Granular catalyst may have a particle size of about 0.1 to 10 mm. average diameter; whereas the powdered or finely divided catalyst may have a particle size of about 5 to about 250 microns, or more usually, about 10 to about 100 microns.

In a moving bed system, generally, a catalyst to oil ratio, on a weight basis, of about 0.05 to about 20.0 or more, more usually, about 0.1 to about 10, preferably about 0.5 to about 2.5 is employed.

Quite unexpectedly, it was observed that eta-alumina is an unusually excellent material for catalysts. It was found that eta-alumina is superior to the well-known gamma-alumina insofar as activity or catalytic property is concerned. This was observed by a comparison between gamma- and eta-aluminas, when each type of alumina was activated with a catalytic agent of this invention. Eta-alumina is not only superior to gamma-alumina in catalytic property, but it also cooperates with the catalytic agent, viz., platinum and/or palladium. The cooperation is manifested as an increase in catalytic activity and selectivity, particularly in the case of hydrocarbon conversion, e.g., reforming of naphtha fractions.

Eta-alumina does not occur in the natural state, but instead, it is a form of alumina which is prepared synthetically. Heretofore, the use of other types of alumina, such as gamma-alumina, has already been widely used in catalysts wherein the alumina is employed as a catalytic component and/or a carrier material. Eta-alumina represents a distinct and different form of alumina from gamma-alumina or any other known types of alumina. By X-ray analysis the particular crystalline form is determined by the relative intensities and the "$d$" spacings of the reflections or lines appearing in the X-ray diffraction pattern. For the purpose of comparison, the relative intensity of the various "$d$" spacings or lines, expressed in angstrom units, for gamma- and eta-alumina are given below.

| Gamma-Alumina | | Eta-Alumina | |
|---|---|---|---|
| "$d$" | Relative Intensity | "$d$" | Relative Intensity |
| 2.8 | VW | 4.6 | W |
| 2.42 | MW | 2.8 | W |
| 2.30 | M (Sharp) | 2.4 | M |
| 2.20 | VVW | 2.3 | W |
| 2.20 | VVW | 1.98 | SM |
| 2.10 | VVW | 1.98 | SM |
| 2.00 | SM* | 1.53 | VW |
| 1.97 | M* | | |
| 1.53 | VW | 1.40 | S |
| 1.40 | S | 1.21 | VVW |
| 1.15 | VW | 1.14 | VW |
| 1.04 | VVW | 1.03 | VVW |
| 0.99 | VVW | 0.99 | VVW |

*These lines are usually observed together as a single relatively broad line at 1.98.

The symbols used for designating relative intensity are "S" for strong, "M" for medium, "SM" for strong to medium, "W" for weak, "VW" for very weak and "VVW"

for very, very weak. On the basis of the latest work done on eta-alumina, it appears that it belongs to the cubic spinel system and contains a unit cell parameter of 7.94 A.

The use of eta-alumina in combination with platinum and/or palladium yields a catalyst which possesses exceptional qualities for the conversion of hydrocarbons. Generally, for such a result eta-alumina in the catalyst comprises about 75 to about 99.9%, preferably about 90 to about 99.9% by weight, based on the total catalyst; whereas the platinum and/or palladium comprise about 0.05 to about 5% by weight, of the total catalyst. In view of the high cost of the platinum and palladium, it is preferred to employ about 0.1 to about 2% by weight of platinum and/or palladium, based on the total catalyst, because the beneficial effects derived from the use of higher platinum and/or palladium concentrations does not warrant the high cost.

It is also intended in the present invention to employ silica in combination with eta-alumina as a carrier material for platinum and/or palladium. Silica possesses the property of imparting a significant increase in heat stability of the catalytic material at elevated temperatures. Further, small amounts of silica unexpectedly impart to the catalyst the property of inhibiting cracking to coke and nomally gaseous materials when employed for the purpose of reforming hydrocarbon oils. This is an unexpected advantage because, in any reforming operation, it is desired to effect an octane improvement with as low a loss of feed material through the formation of such products as is possible. Surprisingly, silica in small amounts, viz., about 0.01 to about 15% by weight, based on the total catalyst, reduces, in a significant manner, the production of coke and normally gaseous products in a reforming operation. Hence, silica serves the two-fold purpose of imparting greater heat stability to the catalyst, as well as inhibiting cracking when the catalyst is employed in a reforming operation.

Eta-alumina is prepared, for example, by reacting aluminum metal and water in the presence of hydrochloric acid and mercuric oxide to first form alumina sol. The sol is coagulated to a gel by treatment with an alkaline reagent, e.g., ammonium hydroxide, to obtain a high pH in the order of about 8–11. The alkaline gel is then aged for about 5 to about 60 hours, although usually 17 hours is sufficient. The gel thus aged will form eta-alumina upon drying and/or calcination at an elevated temperature, e.g., 900–1200° F. for about 2 to 8 hours. Eta-alumina is also formed by rapidly precipitating hydrous alumina from sodium aluminate by treatment with carbon dioxide at 40° C. Upon washing and calcination, the hydrous alumina forms eta-alumina.

In order to more fully understand the present invention, reference will be had to specific examples thereof, however, it should be understood that no undue limitations or restrictions are to be imposed by reason thereof.

Two catalysts were evaluated for the purpose of comparison. Catalyst I contained 0.5 weight percent of platinum and the remainder gamma-alumina, and Catalyst II contained 0.5 weight percent platinum and the remainder eta-alumina. These catalysts were treated in a laboratory unit using a Mid-continent naphtha having an initial boiling point of 230° F. and an end point of 430° F. This naphtha had an octane number (C.F.R.R.) of 30 and contained approximately 9% aromatics by volume. The reactor of the test unit had a 550 cc. capacity. The catalysts in suitable quantities were charged to the reactor. Hydrogen was fed in a pure state at the rate indicated (s.c.f.b.) measured as standard cubic feet per barrel of oil feed, the volume of gas being measured at 60° F. and 760 mm. mercury. The regeneration of the catalyst was conducted by purging the system with hydrogen after it had become partially deactivated by the accumulation of carbonaceous deposits. The pressure was released and then the system was purged with nitrogen. The catalyst was then heated to about 950° F. and air was introduced along with the nitrogen. The concentration of air was regulated to produce a maximum temperature of 1050° F. in the catalyst bed. During this operation, the temperature in the bed at various points was ascertained with two thermocouples, one located in the upper part and the other in the lower part of the bed. The flow of nitrogen and air through the bed was continued for about ½ hour, after the temperature dropped to about 950° F. Following another nitrogen purge, the system was again placed under hydrogen pressure for about 1 hour, while the hydrogen rate and temperature were being adjusted before feeding the naphtha again.

The data obtained in the test unit are reported in Table I below.

*Table 1*

| Run No. | 1 | 2 |
|---|---|---|
| Catalyst No. | I | II |
| Operating Conditions: | | |
| Temperature, ° F. | 877 | 882 |
| Pressure, p.s.i.g. | 500 | 500 |
| Space Vel., $W_o/hr./W_c$ | 1.02 | 0.98 |
| Hydrogen, s.c.f.b. | 4,630 | 4,975 |
| Length of runs, hours | 8 | 8 |
| Yields (Output Basis): | | |
| $C_4$ free gasoline, Vol. percent | 88.8 | 80.7 |
| 100% $C_4$ gasoline, Vol. percent | 92.0 | 87.3 |
| 10# RVP gasoline, Vol. percent | 99.9 | 90.2 |
| Polymer, Vol. percent | 2.7 | 2.6 |
| Carbon, Wt. percent | 0.04 | 0.132 |
| Dry Gas, Wt. percent | 5.3 | 9.6 |
| Feed Cracked, Vol. percent | 19.0 | 49.4 |
| Octane No. C.F.R.R.: | | |
| $C_4$ free gasoline | 71.6 | 86.4 |
| 100% $C_4$ gasoline | 72.6 | 87.4 |
| 10# RVP gasoline | 74.7 | 87.8 |
| Space Vel., for 85 C.F.R.R. 10# RVP gasoline | 0.55 | 1.07 |

It is to be noted that Catalyst II is markedly more active than Catalyst I. This is clearly borne out by the activity which is expressed herein as the space velocity required to obtain an 85 (C.F.R.R.) −10# RVP gasoline.

Having thus described our invention by reference to specific examples thereof, it should be understood that no undue limitations or restrictions are to be imposed by reason thereof, but that the scope of this invention is defined by the appended claims.

We claim:

1. A process for reforming a naphtha fraction which comprises subjecting the naphtha fraction under reforming conditions to contact with a catalyst comprising a residue of a metal selected from the group consisting of platinum and palladium on eta-alumina.

2. A process for reforming naphthas which comprises subjecting a naphtha under reforming conditions to contact with a catalyst comprising platinum on eta-alumina.

3. A process for reforming naphthas which comprises contacting naphtha with a catalyst comprising platinum on eta-alumina, said eta-alumina being present in an amount between about 75 and about 99.9 percent by weight, based on the total catalyst, in the presence of about 0.5 to about 20 mols of hydrogen per mol of naphtha, at a temperature of about 600 to about 1050° F., at a pressure of about 50 to about 1000 p.s.i.g. and at a weight space velocity of about 0.05 to about 10.

4. A process for reforming naphthas which comprises contacting a naphtha with a fluidized mass of finely divided catalytic material comprising platinum on eta-alumina, in the presence of about 0.5 to about 20 mols of hydrogen per mol of naphtha, at a temperature of about 600° to about 1050° F., at a weight space velocity of about 0.05 to about 10, at a pressure of about 100 to about 750 p.s.i.g. and a catalyst to oil ratio of about 0.1 to about 10.

5. A process in accordance with claim 2 wherein said catalyst comprising platinum on eta-alumina contains eta-alumina in an amount between about 75 and about 99.9 percent by weight, based on the total catalyst.

References Cited by the Examiner

UNITED STATES PATENTS

| | | | |
|---|---|---|---|
| 2,274,633 | 3/42 | Pitzer et al. | 196—50.2 |
| 2,277,512 | 3/42 | DeSimo | 260—683.5 |
| Re. 22,196 | 10/42 | Heard | 196—52 |
| 2,371,237 | 3/45 | Heard et al. | 196—50.2 |
| 2,478,916 | 8/49 | Haensel | 196—50.2 |
| 2,479,110 | 8/49 | Haensel | 196—50.2 |
| 2,662,861 | 12/53 | Riblett et al. | 196—50.2 |

OTHER REFERENCES

Stumpf et al.: "Industrial and Eng. Chem.," vol. 42 (1950), pp. 1398–1403.

ALPHONSO D. SULLIVAN, *Primary Examiner.*

EARL M. HUTCHINSON, ALLAN M. BOETTCHER, *Examiners.*